United States Patent
Hsu et al.

(10) Patent No.: US 7,656,587 B2
(45) Date of Patent: Feb. 2, 2010

(54) PROJECTION LENS SYSTEM

(75) Inventors: Te-Lun Hsu, Taipei Hsien (TW); Chun-Hsiang Huang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/233,549

(22) Filed: Sep. 18, 2008

(65) Prior Publication Data

US 2009/0316276 A1    Dec. 24, 2009

(30) Foreign Application Priority Data

Jun. 23, 2008    (CN) .................. 2008 1 0302279

(51) Int. Cl.
G02B 3/00    (2006.01)
G02B 9/00    (2006.01)
G02B 9/34    (2006.01)
G02B 15/14    (2006.01)

(52) U.S. Cl. .............. 359/650; 359/781; 359/686
(58) Field of Classification Search .............. 359/781, 359/686, 715, 660, 650
See application file for complete search history.

(56) References Cited

U.S. PATENT DOCUMENTS 2,849,918 A * 9/1958 Eismann et al. .............. 359/781
6,236,521 B1 * 5/2001 Nanba ........................ 359/715

* cited by examiner

*Primary Examiner*—Alicia M Harrington
(74) *Attorney, Agent, or Firm*—Zhigang Ma

(57) ABSTRACT

An exemplary projection lens system includes, in order from the magnification side to the reduction side thereof, a first lens with negative refraction power, a second lens with positive refraction power, a third lens with negative refraction power, and a fourth lens with positive refraction power. The projection lens system satisfies the formulae $3.7<TT/f<4$; and $BFL/f>1.41$; where TT is a total length of the projection lens, f is an effective focal length of the projection lens system and BFL is a back focal length of the projection lens system.

9 Claims, 4 Drawing Sheets

PROJECTION LENS SYSTEM

BACKGROUND

1. Field of the Invention

The invention relates to lens systems and, particularly, to a projection lens system.

2. Description of Related Art

To provide a sharp projection image and reduce the size of projectors, such as digital light processing (DLP) projectors, liquid crystal display (LCD) projectors, or liquid crystal on silicon (LCOS) projectors, projection lens systems with high resolution and a short overall length (the distance between the magnification-side surface of such a projection lens and a surface of a spatial light modulator (SLM), e.g., digital micro-mirror device (DMD), LCD panel, or LCOS panel, equipped in a projector facing the projection lens) are employed. Factors affecting both the resolution and the overall length of the projection lens, such as the number and position of lenses employed, the refraction power distribution of the employed lenses, and the shape of each of the employed lenses, complicate attempts to increase resolution and shortening the overall length of projection lens systems. For example, although reducing the number of lenses can shorten the overall length of the projection lens system, resolution will suffer. Conversely, increasing the number of lenses can improve the resolution, but predictably, overall length of the projection lens is increased.

Therefore, it is desirable to provide a projection lens system which can overcome the described limitations.

DETAILED DESCRIPTION OF THE EMBODIMENTS

Embodiments of the disclosure will now be described in detail with reference to the drawings.

Figure 1:
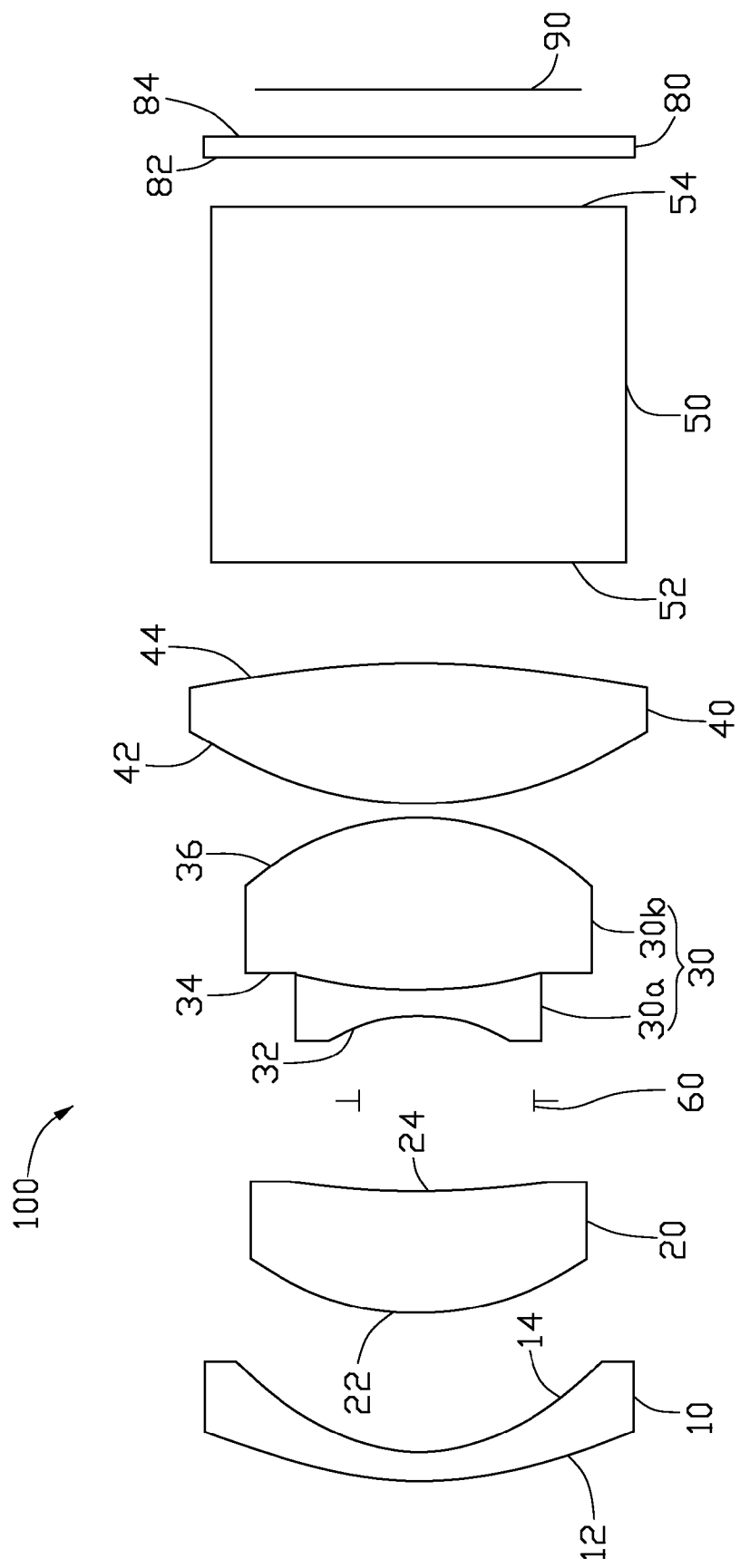
FIG. 1 is a schematic view of a projection lens system in accordance with an embodiment of the disclosure.

Referring to FIG. 1, a projection lens system 100 according to an exemplary embodiment includes, from the magnification side to the reduction side thereof, a first lens 10, a second lens 20, a third lens 30 and a fourth lens 40.

The projection lens system 100 is configured for utilization in a DLP projector. A spatial light modulator (SLM) 90, such as, a digital micro-mirror device (DMD), modulates light signals for projection through the projection lens system 100. The light signals are sequentially transmitted through the fourth lens 40, the third lens 30, the second lens 20, and the first lens 10, and subsequently projected onto a screen (not shown), producing images.

The first lens 10 and the third lens 30 have negative power refractions and the second lens 20 and the fourth lens 40, power positive refractions. To attain a compact projection lens system 100 with good imaging quality, the projection lens system 100 satisfies formulae (1):

$$3.7 < TT/f < 4$$

and (2):

$$BFL/f > 1.41$$

where TT is a total length of the projection lens system 100 and a distance between a screen-side surface of the first lens 10 and the SLM 90, f is an effective focal length of the projection lens system 100 and BFL is a back focal length of the projection lens system 100 and a distance between the a SLM-side surface of the third lens 40 and the SLM 90.

Formulae (1), (2) are adapted for distributing the refraction power of the lens 10, 20, 30, 40, to limit the overall length of the projection lens system 100, and control/correct aberrations of the projection lens system 100 within an acceptable level. Formula (1), $3.7 < TT/f < 4$ is configured to limit the overall length of the projection lens system 100. Concurrently, refraction power of the first lens 10, the second lens 20, the third lens 30, and the fourth lens 40 is arranged to balance the total length and optical aberration of the projection lens system 100. Formula (2) is configured to limit the back focal length of the projection lens system 100 to a proper length, thereby allowing other optical devices of the projector (e.g. an optical engine) to be installed between the fourth lens 40 and the SLM 90. In the embodiment, prism 50 and filter 80, in order from the magnification side to the reduction side of the projector, are located between the fourth lens 40 and the SLM 90. The prism 50 is configured for dividing the light beam to alter the direction of the light. The filter 80 is configured for protecting the SLM 90.

The projection lens system 100 satisfies the formula: (3) $-1.6 < f1/f4 < -1.38$, where f1 and f4 are the effective focal lengths of the first lens 10 and the fourth lens 40 respectively. Formula (3) is configured to limit the overall length of the projection lens system 100, as well as wide the field angle of the projection lens system 100.

The projection lens system 100 also satisfies the formula: (4) $0.92 < f2/f4 < 1.05$, where f2 is the effective focal length of the second lens 20. Formula (4) is adapted to satisfy a proper distribution of refraction power of the projection lens system 100. In addition, formula (4) provides control of aberrations in the projection lens 100, especially those caused by the second lens 20 and the fourth lens 40.

Specifically, the projection lens system 100 further includes an aperture stop 60 interposed between the second lens 20 and the third lens 30 to prevent off-axis light rays from the third lens 30 from entering the second lens 20, and as a result, correct coma aberration of the projection lens system 100. To reduce cost and total length of the projection lens system 100, the aperture stop 60 can be formed by applying an opaque material to an outer rim of a surface of the third lens 30 on the magnification-side.

In this embodiment, the third lens 30 constitutes a lens 30a with a negative power refraction and a lens 30b with a positive power refraction. The lenses 30a, 30b, in order from the magnification side to the reduction side, of the projector are located between the aperture stop 60 and the fourth lens 40. The lenses 30a, 30b are secured via glue.

In the embodiment, the second lens 20 and the third lens 30 in the projection lens system 100 are glass to achieve better image quality, while the first lens 10 and the fourth lens 40 in the projection lens system 100 are plastic to reduce costs. The magnification-side surface 22 and the reduction-side surface 24 of the second lens 20, along with the magnification-side surface 32, 34 and the reduction-side surface 36 of the third lens 30, are all spherical. Specifically, the second lens 20 and the third lens 30 are spherical lenses. The magnification-side surface 12 and the reduction-side surface 14 of the first lens 10, along with the magnification-side surface 42 and a reduction-side surface 44 of the fourth lens 40, are all aspherical. That is, the first lens 10 and the fourth lens 40 are aspherical lenses.

The aspherical surfaces are shaped according to the formula:

$$x = \frac{ch^2}{1+\sqrt{1-(k+1)c^2h^2}} + \sum A_i h^i$$

where h is a height from the optical axis of the projection lens system 100 to the aspherical surface, c is a vertex curvature, k is a conic constant, and Ai are i-th order correction coefficients of the aspheric surfaces.

Figure 2:
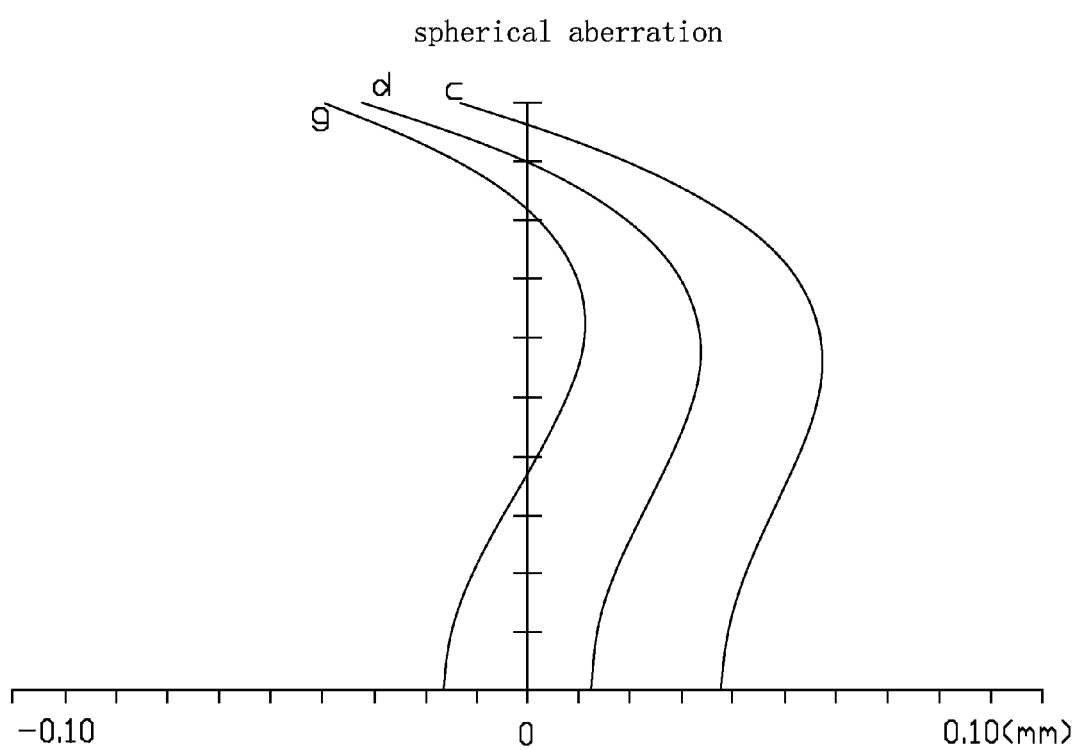
FIGS. 2-4 are graphs respectively showing spherical aberration, field curvature, and distortion of the projection lens system of FIG. 1.
Figure 3:
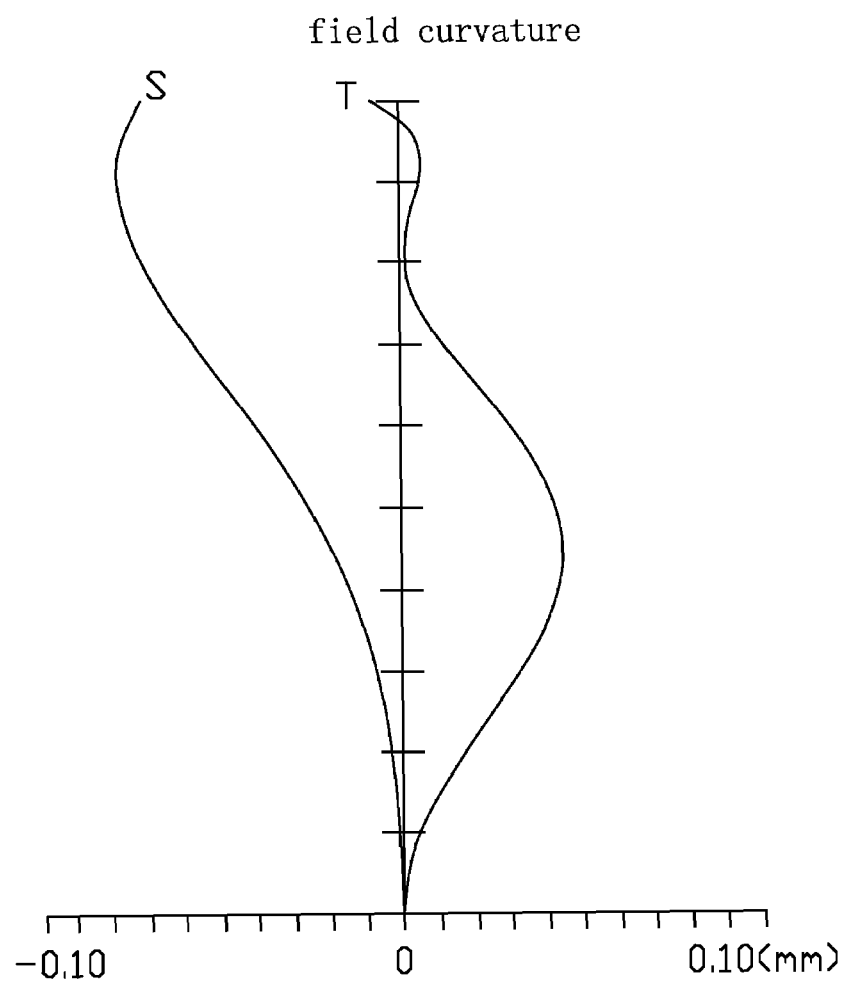
Figure 4:
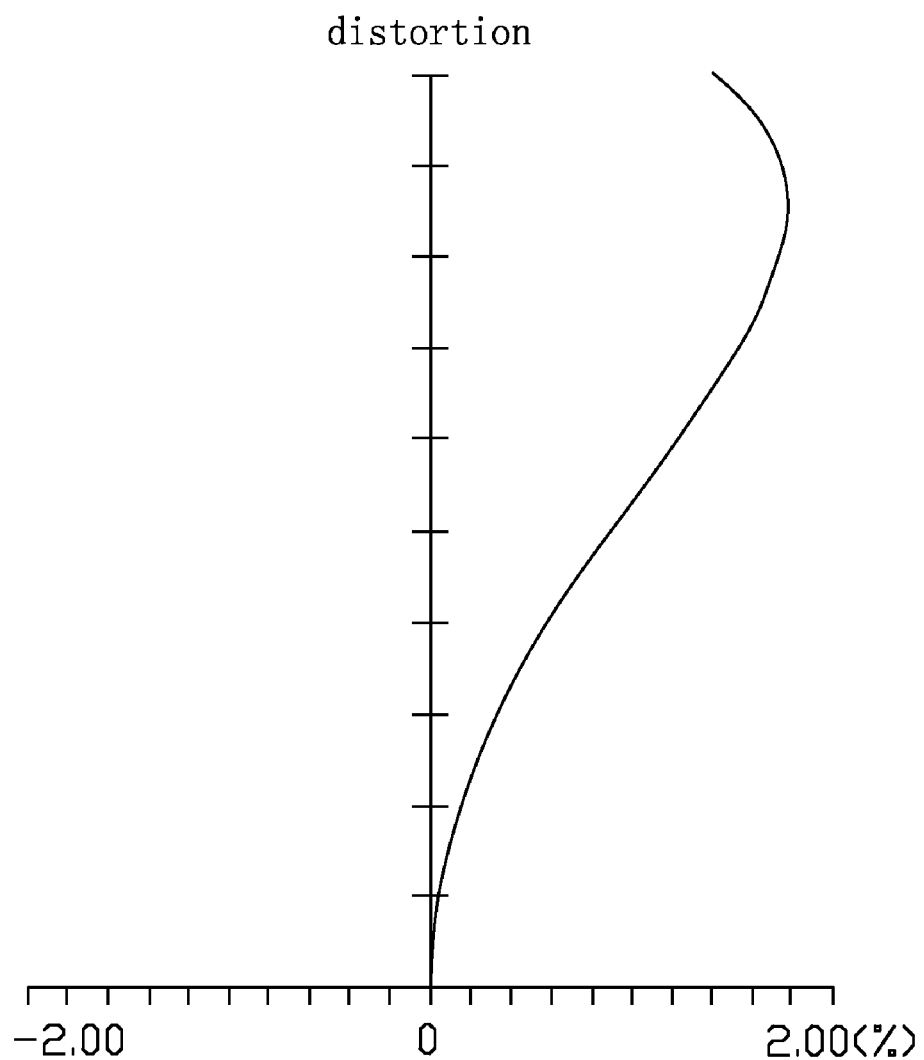

Detailed examples of the projection lens system 100 are given here in company with references to FIGS. 2-4, but it should be noted that the projection lens system 100 is not limited to thereto. Following are the symbols used in these detailed examples:

FNo: F number;
2ω: field angle;
R: radius of curvature;
d: distance between surfaces on the optical axis of the projection lens system 100;
Nd: refractive index of lens; and
V: Abbe constant.

In this embodiment, the prism 50 has a magnification-side surface 52 and a reduction-side surface 54. The filter 80 has a magnification-side surface 82 and a reduction-side surface 84.

Example

Tables 1, 2 show the lens data of Example 1, wherein TT=68.63 mm, f=18.25 mm, ff=−33.22 mm, f2=21.95 mm, f4=23.84 mm, BFL=25.83 mm, FNo=2.0; 2ω=33.6°.

TABLE 1

| Surface | R (mm) | d (mm) | Nd | V |
|---|---|---|---|---|
| 12 | 19.53 | 1.5 | 1.53 | 55.7 |
| 14 | 9.04 | 7.32 | — | — |
| 22 | 13.99 | 6.42 | 1.8 | 34.9 |
| 24 | 53.24 | 5.17 | — | — |
| 60 | infinite | 3.99 | — | — |
| 32 | −8.94 | 1.4 | 1.75 | 27.5 |
| 34 | 23.39 | 9 | 1.62 | 58.1 |
| 36 | −12.39 | 0.77 | — | — |
| 42 | 17.28 | 7.4 | 1.53 | 55.7 |
| 44 | −40.89 | 5.99 | — | — |
| 52 | infinite | 18.7 | 1.62 | 36.3 |
| 54 | infinite | 1.3 | — | — |
| 82 | infinite | 1.05 | 1.52 | 58.5 |
| 84 | — | 1.78 | — | — |

TABLE 2

| Surface | Aspherical coefficient |
|---|---|
| 12 | K = 0; A4 = −2.20E−05; A6 = 4.09E−07; A8 = 2.10E−09; A10 = −1.12E−11; A12 = 3.75E−14; |
| 14 | K = −0.46; A4 = −3.63E−05; A6 = 9.72E−07; A8 = 2.15E−09; A10 = −5.20E−11; A12 = 2.14E−13; |
| 42 | K = −0.03; A4 = −1.86E−05; A6 = 6.95E−09; A8 = −9.18E−10; A10 = 7.60E−12; A12 = −4.74E−14; |
| 44 | K = −0.05; A4 = 4.38E−05; A6 = 1.39E−07; A8 = 5.53E−10; A10 = 4.05E−12; A12 = −1.08E−14; |

As illustrated in FIG. 2, curves f, d, and c are respectively spherical aberration characteristic curves of f light (wavelength: 486.1 nm), d light (587.6 nm), and c light (656.3 nm) of the projection lens system 100 of Example 1. The spherical aberration of projection lens system 100 of Example 1 is from −0.1 mm to 0.1 mm. In FIG. 3, the curves t and s are the tangential field curvature curve and the sagittal field curvature curve respectively. The field curvature of the projection lens system 100 of Example 1 is from −0.1 mm to 0.1 mm. In FIG. 4, the distortion of the projection lens system 100 of Example 1 is from −2% to 2%.

In Example 1, though the overall length of the projection lens system 100 is reduced, aberrations of the projection lens system 100 are maintained within an acceptable range. The projection lens system 100 keeps chromatic aberrations at a minimum while reducing the total length of the projection lens system 100.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of arrangement of parts within the principles of the invention to the full extent indicated by the broad general meaning of the terms in which the appended claims are expressed.

What is claimed is:

1. A projection lens system comprising, in order from the magnification side to the reduction side thereof, a first lens with negative refraction power, a second lens with positive refraction power, a third lens with negative refraction power, and a fourth lens with positive refraction power, wherein the projection lens system satisfies the following formulae:

$3.7 < TT/f < 4$ and $BFL/f > 1.41$ where TT is a total length of the projection lens, f is an effective focal length of the projection lens system and BFL is a back focal length of the projection lens system.

2. The projection lens system of claim 1, wherein the projection lens system satisfies the formula −1.6<f1/f4<−1.38, where f1 and f4 are the effective focal lengths of the first lens and the fourth lens respectively.

3. The projection lens system of claim 1, wherein the projection lens system satisfies the formula 0.92<f2/f4<1.05, where f2 and f4 are the effective focal lengths of the second lens and the fourth lens respectively.

4. The projection lens system of claim 1, further comprising an aperture stop interposed between the second lens and the third lens.

5. The projection lens system of claim 4, wherein the aperture stop comprises an opaque material on an outer rim of a surface of the third lens on the magnification side.

6. The projection lens system of claim 1, wherein the second lens and the third lens are spherical lenses.

7. The projection lens system of claim 1, wherein the second lens and the third lens are glass.

8. The projection lens system of claim 1, wherein the first lens and the fourth lens are aspherical lenses.

9. The projection lens system of claim 1, wherein the second lens and the third lens are plastic.

* * * * *